(12) United States Patent
Fiedler et al.

(10) Patent No.: US 10,703,429 B2
(45) Date of Patent: *Jul. 7, 2020

(54) CLOSURE DEVICE FOR CONNECTING A CONTAINER E.G. TO A BICYCLE

(71) Applicant: Fidlock GmbH, Hannover (DE)

(72) Inventors: Joachim Fiedler, Hannover (DE); Breido Botkus, Hannover (DE); Friedemann Richter, Hannover (DE); Jürgen Spindler, Regensburg (DE)

(73) Assignee: Fidlock GmbH, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/327,999

(22) PCT Filed: Aug. 24, 2017

(86) PCT No.: PCT/EP2017/071349
§ 371 (c)(1),
(2) Date: Apr. 15, 2019

(87) PCT Pub. No.: WO2018/041716
PCT Pub. Date: Mar. 8, 2018

(65) Prior Publication Data
US 2019/0308684 A1 Oct. 10, 2019

(30) Foreign Application Priority Data

Aug. 31, 2016 (DE) .......................... 10 2016 216 422

(51) Int. Cl.
*B62J 11/00* (2020.01)
*B62J 7/08* (2006.01)
(Continued)

(52) U.S. Cl.
CPC ................. *B62J 11/00* (2013.01); *F16B 1/00* (2013.01); *F16B 2001/0035* (2013.01); *H01F 7/0263* (2013.01)

(58) Field of Classification Search
CPC .......... B62J 11/00; B62J 11/02; A43C 11/165; F16B 2001/0035; A45C 13/1069; Y10T 24/32
(Continued)

(56) References Cited

U.S. PATENT DOCUMENTS 6,281,674 B1 * 8/2001 Huang .................. B62J 11/00
324/174
7,150,382 B2 * 12/2006 Zickefoose .............. B62J 11/00
224/423
(Continued)

FOREIGN PATENT DOCUMENTS

CN 2571651 Y 9/2003
DE 29502746 U1 4/1995
(Continued)

OTHER PUBLICATIONS

Fidlock, "Launch of our brand new booth at the Eurobike 2016!", Eurobike 2016, Facebook post (Aug. 30, 2016).

*Primary Examiner* — Justin M Larson
(74) *Attorney, Agent, or Firm* — The Webb Law Firm

(57) ABSTRACT

A closure device for connecting a container to a frame of a vehicle, in particular of a two-wheeler or a three-wheeler, includes a first closure part which is to be arranged on the frame and comprises a first magnet element and a second closure part which is assigned to the container and comprises a second magnet element. The second closure part is positionable on the first closure part in a closing direction and is latched mechanically with the first closure part in a closed position. The second closure part is releasably connectable to the container.

19 Claims, 6 Drawing Sheets

(51) Int. Cl.
  *H01F 7/02* (2006.01)
  *F16B 1/00* (2006.01)
(58) Field of Classification Search
  USPC ....... 224/414, 428, 431, 436, 441, 451, 455, 224/459, 460, 545, 547, 567, 56, 8, 926, 224/568
  See application file for complete search history.

(56) References Cited

U.S. PATENT DOCUMENTS

| | | | |
|---|---|---|---|
| 8,368,494 B2 | 2/2013 | Fiedler | |
| 8,464,403 B2* | 6/2013 | Fiedler | A44B 11/25 24/303 |
| 8,469,248 B2* | 6/2013 | Weng | B62J 11/00 224/414 |
| 8,495,803 B2* | 7/2013 | Fiedler | A45C 13/1069 220/230 |
| 8,794,682 B2* | 8/2014 | Fiedler | A45C 13/1069 24/303 |
| 9,383,774 B2* | 7/2016 | Whitten | G06F 1/1656 |
| 9,397,719 B1* | 7/2016 | Schmidt | F16M 11/24 |
| 9,611,881 B2* | 4/2017 | Khodapanah | F16M 13/02 |
| 9,729,185 B2* | 8/2017 | Scully | F16M 13/02 |
| 9,758,080 B2 | 9/2017 | Goldman | |
| 10,167,030 B1* | 1/2019 | Smith | B62H 1/02 |
| 10,292,514 B1* | 5/2019 | Kuhn | A47G 23/0225 |
| 10,328,983 B2* | 6/2019 | Fiedler | H01F 7/0263 |
| 2004/0173719 A1 | 9/2004 | Mitchell | |
| 2011/0030174 A1* | 2/2011 | Fiedler | A45C 13/1069 24/303 |
| 2011/0042435 A1* | 2/2011 | Weng | B62J 11/00 224/414 |
| 2011/0147424 A1 | 6/2011 | Brown et al. | |
| 2011/0298227 A1* | 12/2011 | Fiedler | A45C 13/1069 292/251.5 |
| 2014/0265765 A1* | 9/2014 | Khodapanah | F16M 13/02 312/223.1 |
| 2014/0308062 A1 | 10/2014 | Belozerova et al. | |
| 2016/0277552 A1* | 9/2016 | Scully | F16M 13/02 |
| 2016/0373152 A1* | 12/2016 | Schmidt | H04B 1/3877 |
| 2017/0197558 A1* | 7/2017 | Spector | B60R 11/06 |
| 2017/0276290 A1* | 9/2017 | Fiedler | F16M 11/041 |
| 2018/0222544 A1* | 8/2018 | Fiedler | H01F 7/0263 |
| 2018/0360147 A1* | 12/2018 | Fiedler | A44B 13/0052 |
| 2019/0152559 A1* | 5/2019 | Jentzsch | B62M 3/086 |

FOREIGN PATENT DOCUMENTS

| | | |
|---|---|---|
| DE | 102007058188 A1 | 6/2009 |
| WO | 2012151320 A9 | 11/2012 |

* cited by examiner

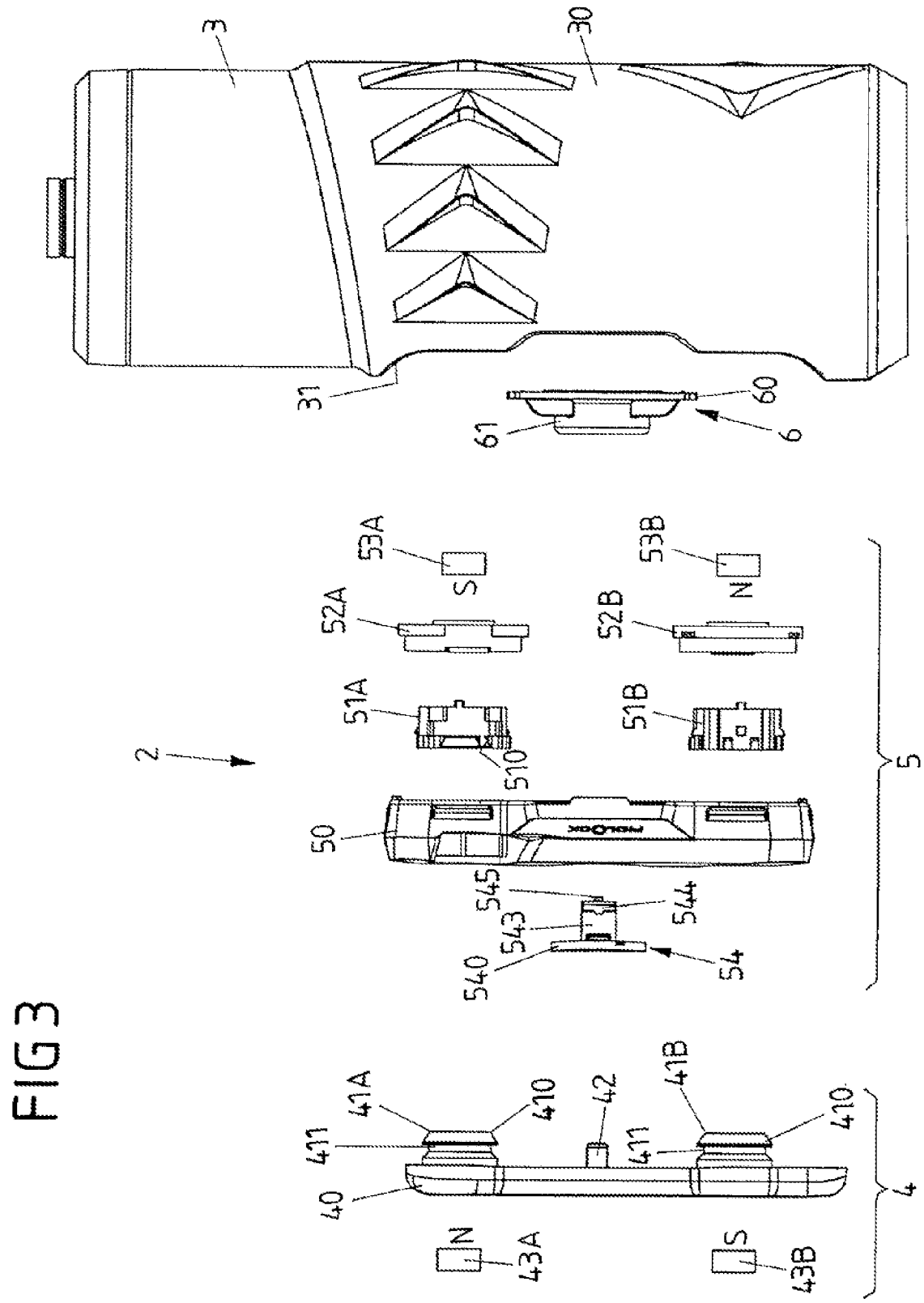

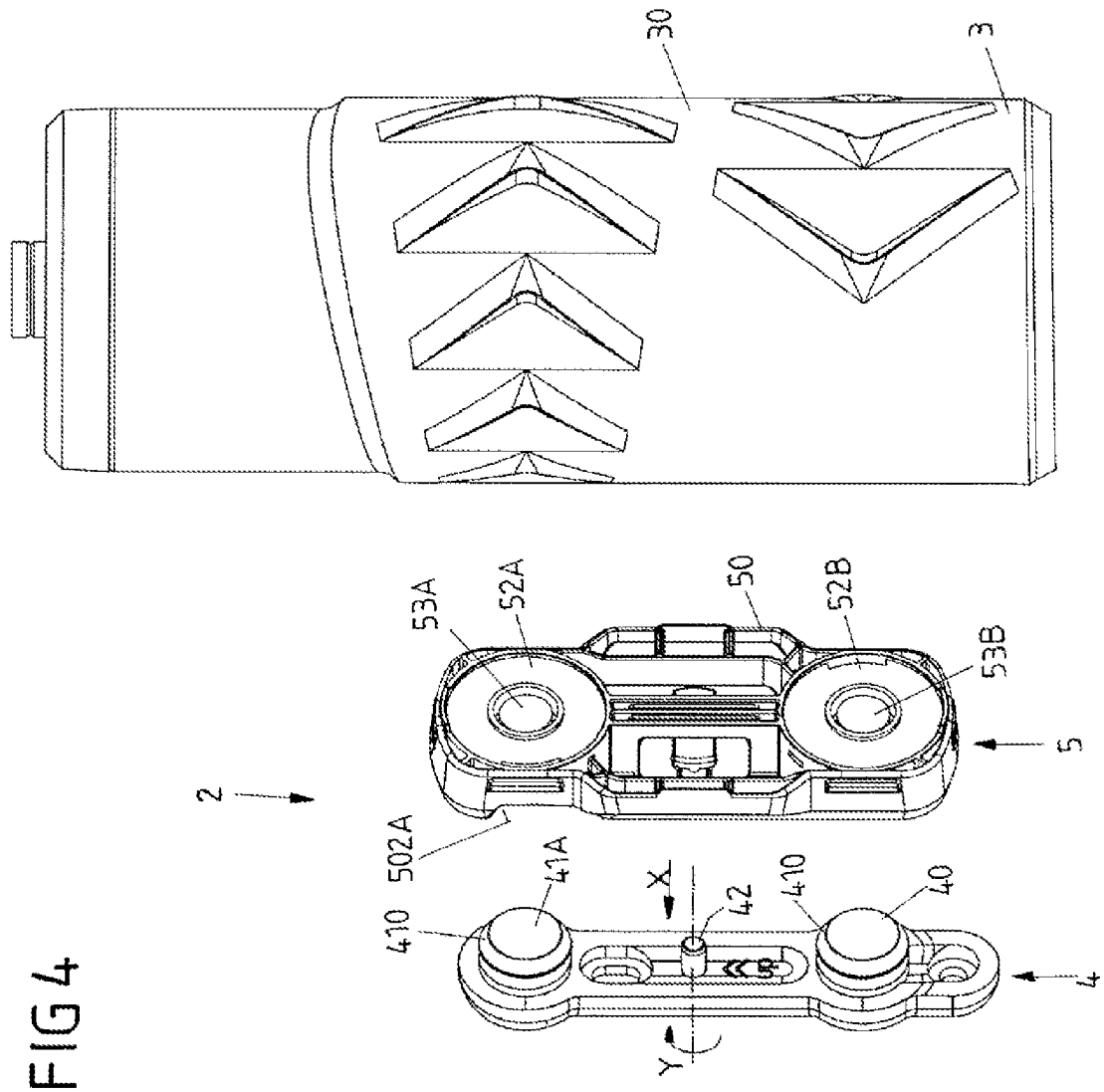

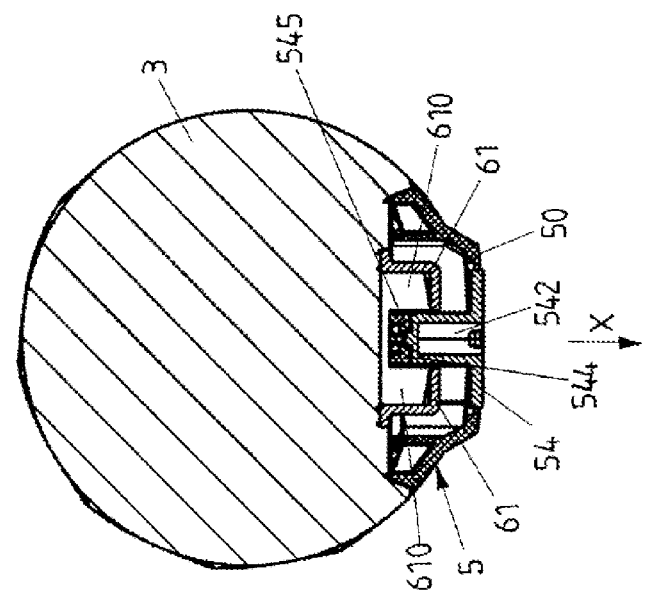
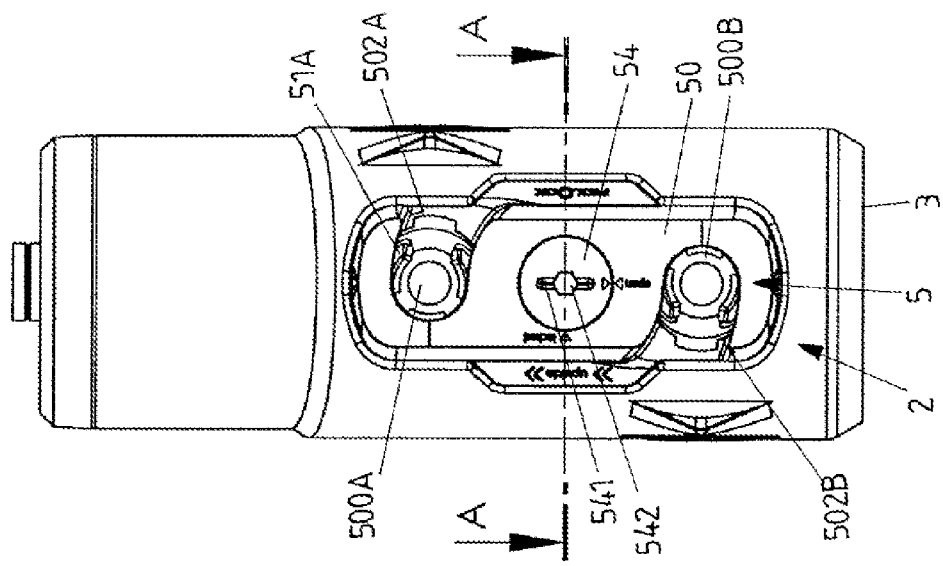

CLOSURE DEVICE FOR CONNECTING A CONTAINER E.G. TO A BICYCLE

CROSS-REFERENCE TO RELATED APPLICATIONS

This application is the United States national phase of International Application No. PCT/EP2017/071349 filed Aug. 24, 2017, and claims priority to German Patent Application No. 10 2016 216 422.8 filed Aug. 31, 2016, the disclosure of each of which is hereby incorporated by reference in its entirety.

BACKGROUND OF THE INVENTION

Field of the Invention

The disclosure relates to a closure device for connecting a container to a frame of a vehicle, in particular of a two-wheeler or a three-wheeler.

Technical Considerations

Such a closure device includes a first closure part which is to be arranged on the frame and comprises a first magnet element, and a second closure part which is assigned to the container and comprises a second magnet element, wherein the second closure part is positionable on the first closure part in a closing direction and is latched mechanically with the first closure part in a closed position.

Such a closure device can serve, for example, for fastening a container in the form of a drinking bottle to the frame of a bicycle.

In the case of a closure disclosed in WO 2012/151320 A9, a clamping bracket is fastened to a frame and comprises magnet elements which interact with a magnetically active ring of the drinking bottle for fastening a drinking bottle to the frame.

In addition, fastening containers in the form of drinking bottles in a latching manner to a frame of a vehicle is known, the use of magnetic elements for securing the connection also being contemplated in this context.

In general, a closure device, by way of which a container (for example a drinking bottle) is able to be fixed to the frame of a vehicle (in particular of a two-wheeler or of a three-wheeler), is to be simple to operate. The container is to be able to be accommodated in a space-saving manner on the vehicle, for example in a frame opening of a bicycle frame only limited space being available. The closure device is to take up a small amount of installation space in the open position both on the vehicle and on the container so that the closure parts of the closure device do not cause any bother. It is additionally desirable to design the closure device so as to be cheap, it also having to be considered, in particular, that containers, for example in the form of drinking bottles, have to be replaced after a limited period of use.

SUMMARY OF THE INVENTION

It is the object underlying the proposed solution to provide a closure device which is simple to handle, enables a container to be fastened reliably to the frame of a vehicle and in addition is versatile in use.

Said object is achieved by a closure device with features as described herein.

The second closure part is accordingly releasably connectable to the container.

The present closure device is usable in a modular manner together with completely different containers. By the second closure device being able to be connected releasably to the container, the closure device can be used for connecting different containers to the frame of a vehicle, in particular to the frame of a bicycle. The releasable connection between the second closure part and the container makes it possible, in particular, to exchange the container and to replace it by another container which can be of the same type or also of a completely different type.

The second closure part can be connectable in particular in a positive locking manner to an adaptor part of the container. To release the connection between the second closure part and the container, the positive locking closure can be eliminated such that the second closure part is able to be separated from the adaptor part and consequently from the container. The adaptor part, in this connection, is connected fixedly to the container, for example is welded to the container or fixed to the container in another manner or also integrated in one piece in the container.

In one design, the second closure part comprises a body and a fastening element which is arranged on the body so as to be adjustable (in particular rotatable). The fastening element serves for the purpose of connecting the second closure part to the container in a first position—with the second closure part positioned on the container. The fastening element can be moved out of said first position in order to release the connection between the container and the second closure part such that as a result of adjusting the fastening element, in particular as a result of rotating the fastening element, the second closure part can be separated in a simple manner from the container in order to connect the second closure part, for example, to another container.

Containers, for example in the form of drinking bottles, are generally available cheaply and have to be replaced regularly, after prolonged use. By the second closure part being releasably connected to the container, the replacement of the container does not mean that the closure device also has to be replaced. Rather, it is possible to re-use the closure device by the second closure part being connected to another container.

The fastening element can be adjustable for example in a simple manner manually or by using a simple tool, for example a screwdriver or a coin or the like. For example, the fastening element can comprise a slot in which a coin is able to engage in order to rotate the fastening element.

In order to produce the connection to the container, the fastening element can comprise, for example, a locking web which, as a result of adjustment, in particular rotation, can be moved into engagement in a positive locking manner with at least one locking element on the side of the adaptor part of the container.

The closure parts of the closure device can be positioned together in the closing direction in order to close the closure device and to connect the closure parts together. The closing of the closure device, in this connection, is supported magnetically by the magnet elements of the closure parts such that when the closure parts are positioned together the closure parts are pulled toward one another magnetically and consequently move into the closed position thereof.

In the closed position, the closure parts are latched together mechanically such that the closure parts are held together in a loadable and positive locking manner. To this end, one of the closure parts can comprise, for example, a blocking piece and the other of the closure parts, for example, a locking element which engage in one another in the closed position in such a manner that the second closure part is fixed on the first closure part in opposition to the closing direction.

Whilst the blocking piece can be realized, for example, as the aforementioned locking pin, the locking element can be realized, for example, as a component that is elastically resilient transversely to the closing direction. When the closure device is closed, a latching projection of the blocking piece can consequently run onto a latching projection of the locking element and in this way urge the locking element aside in an elastically resilient manner until the blocking piece snaps into engagement in a positive locking manner with the locking element. In the closed position then, the latching projections of the blocking piece and of the locking element engage one another so that the closure parts are held together in a positive locking manner.

In one design, the locking element can be realized, for example, in a ring-shaped manner, the locking element being open, for example, at a circumferential point by an opening, through which the blocking piece can be moved for opening the closure device. The locking element consequently realizes a C-ring which, in the closed position, encompasses the blocking piece at least in part and as a result holds it in a positive locking manner. For opening, the blocking piece can be moved through the opening formed at a circumferential point of the locking element so that the blocking piece can be moved out of engagement with the locking element and as a result is able to be released from the locking element.

The opening of the closure device for releasing the closure parts from one another can be effected as a result of the second closure part being moved in relation to the first closure part in an opening direction which is different to the closing direction. As a result of the movement in the opening direction, the latching between the closure parts is able to be eliminated so that the closure parts are able to be released from one another and the container assigned to the second closure part is consequently able to be removed from the frame of the vehicle.

The fact that the opening direction differs from the closing direction, is to be understood in the present case as the opening direction pointing in a different direction to the closing direction and also, in particular, not being directed in opposition to the closing direction. The opening direction can lie, for example, in a plane extending transversely to the closing direction and can be realized, for example, by a rotational direction directed about the closing direction.

The closing of the closure device can consequently be effected as a result of the closure parts being positioned together in the closing direction. The opening of the closure device is then effected as a result of the closure parts being rotated relative to one another about the closing direction in order to eliminate the latching between the closure parts in this way.

In order to ensure simple, smooth handling for opening the closure device, one of the closure parts can comprise, for example, a pivot which engages in a rotational opening of the other closure part in the closed position and mounts the closure parts together so as to be rotational along the opening direction (directed about the closing direction). For opening, the closure parts can consequently be rotated in relation to one another around the pivot so that the opening movement is guided. In particular, the closure parts tilting in relation to one another during opening can be avoided in this way.

In a specific design, the pivot can be realized, for example, on the first closure part and can protrude along the closing direction from a body of the first closure part. The rotational opening can be realized, in contrast, for example, on the second closure part, for example in the fastening element which is arranged on the second closure part and by means of which the second closure part is connected releasably to the container.

In one design, the first closure part and the second closure part can each comprise, for example, two magnet elements, which are realized by permanent magnets. The magnet elements of each closure part are spaced apart from one another transversely to the closing direction, the magnet elements of the first closure part interacting in a magnetically attracting manner with the magnet elements of the second closure part during closing and consequently supporting the closing of the closure device in a magnetic manner.

The closure parts are consequently automatically pulled toward one another when positioned so that the closing of the closure device, in an advantageous design, can be effected at least largely in an automatic manner.

In an advantageous design, the magnet elements of each closure part point toward the respectively other closure part with opposite magnetic poles. The two magnet elements of the first closure part consequently point toward the second closure part with different magnetic poles, namely a north pole and a south pole. The magnet elements of the second closure part point just the same toward the first closure part with different magnetic poles, namely a south pole and a north pole. Said opposite polarization of the magnet elements on each closure part ensures that the closure parts are only able to be positioned together in precisely one position, which helps to avoid the closure parts being positioned together incorrectly and, where applicable, the closure parts being connected together incompletely.

A container for using on a bicycle can be realized, for example, as a bottle, bag or as another container. The container can realize, for example, a drinking bottle, a tool container or a container for a battery. The container can be realized, in particular, as a rigid structure (with a rigid body) or also as a flexible fabric (for example as a bag with a flexibly deformable body).

The closure device of the type described above can be used, in particular, on a bicycle, such a bicycle being able to be driven by human pedal power or also electrically.

BRIEF DESCRIPTION OF THE DRAWINGS

The concept on which the solution is based is to be explained in more detail below by way of the exemplary embodiment shown in the figures, in which:

FIG. 3 shows a side representation of the exploded view;

FIG. 4 shows a view of the closure parts of the closure device;

FIG. 6A shows the front view according to FIG. 5A, with a fastening element rotated to release the second closure part from the container; and FIG. 6B shows a sectional view along the line A-A according to FIG. 6A.

DESCRIPTION OF THE INVENTION

Figure 1:
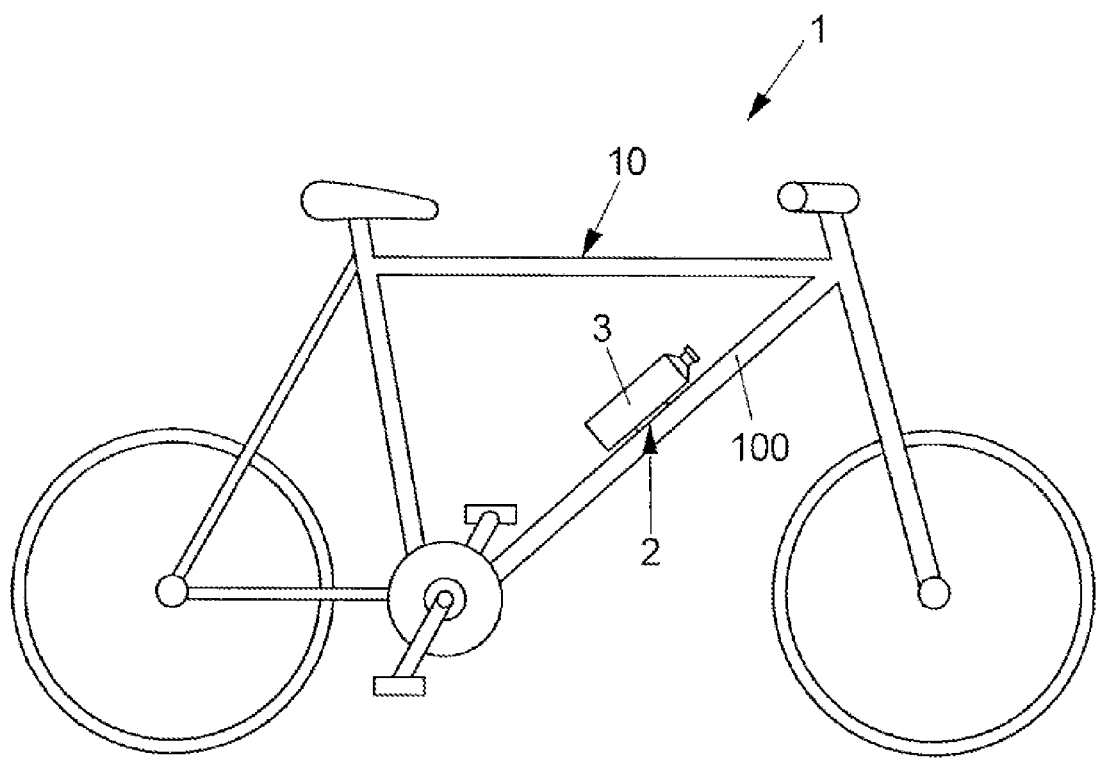
FIG. 1 shows a schematic view of a vehicle in the form of a bicycle.
Figure 2:
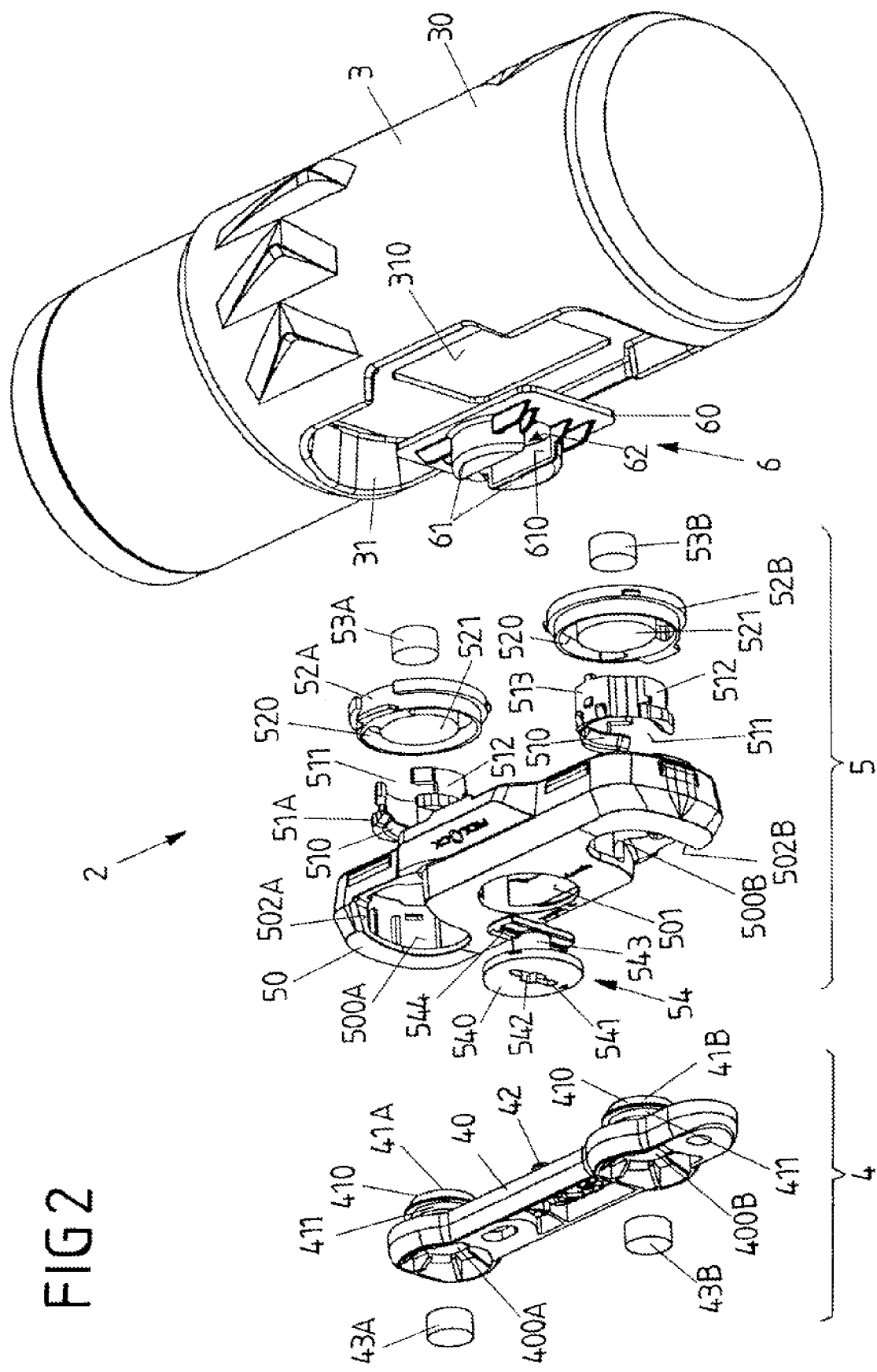
FIG. 2 shows an exploded view of a closure device for fastening a container to a frame of the vehicle.

FIG. 1 shows a schematic view of a vehicle 1 in the form of a bicycle which comprises a frame 10 with a frame bar 100, on which a container 3, for example in the form of a drinking bottle or a different container, for example a bag, is positioned by means of a closure device 2.

FIGS. 2 to 6A, 6B show an exemplary embodiment of a closure device 2 which serves for connecting a container 3 to the frame 10 of a vehicle 1. The closure device 2 comprises a first closure part 4, which is to be connected, for example is to be screw-connected, fixedly to a frame bar 100 of the frame 10 of the vehicle 1. A second closure part 5, which is to be fixedly connected to the container 3 (but in this case is releasable, as is to be explained again below), can be positioned on the first closure part 4. By positioning the container 3 with the second closure part 5 fastened thereon on the first closure part 4 arranged on the frame 10, the container 3 can consequently be fixed to the frame 10 of the vehicle 1.

The first closure part 4 comprises a body 40 from which two blocking pieces 41A, 41B protrude. The blocking pieces 41A, 41B each comprise a shank 411, on the end of which remote from the body 40 is realized a latching projection 410 which extends around the shank 411 and, in this case, protrudes radially outward from the shank 411.

On the side remote from the blocking pieces 41A, 41B, the body 40 comprises receiving openings 400A, 400B at the site of the blocking pieces 41A, 41B into which magnet elements 43A, 43B are inserted and connected fixedly to the body 40.

The second closure part 5 comprises a body 50 in which are formed two closure openings 500A, 500B, in each of which a locking element 51A, 51B is received by means of a fastening plate 52A, 52B. The locking elements 51A, 51B are received in fastening grooves 520 of the fastening plates 52A, 52B and are fastened therein and encompass magnet receiving means 521 which are realized as raised portions and in each of which one magnet element 53A, 53B is arranged.

The locking elements 51A, 51B are realized in a ring-shaped manner, but in this case are open on the circumference by one opening 511 each so that the locking elements 51A, 51B provide C-rings. Each locking element 51A, 51B is fixed in such a manner on the assigned fastening plate 52A, 52B that the locking element 51A, 51B is elastically resilient and in particular is able to be spread radially in order to make it possible for the blocking pieces 41A, 41B of the first closure part 4 to engage in the locking elements 51A, 51B of the second closure part 5.

Each locking element 51A, 51B comprises a latching projection 510 which is circumferential on the inside (where applicable interrupted in portions) and protrudes radially inward from an annular body 512 of the locking element 51A, 51B. With the closure device 2 in the closed position, the latching projections 510 of the locking elements 51A, 51B are in latching engagement with the latching projections 410 of the blocking pieces 41A, 41B of the first closure part 4 so that the closure parts 4, 5 are held together in a positive locking manner.

In the mounted position, the locking elements 51A, 51B, held by means of the fastening plates 52A, 52B, lie in the closure openings 500A, 500B of the body 50 of the second closure part 5.

For closing the closure device 2, the second closure part 5 can be positioned on the first closure part 4 in a closing direction X, as shown in FIG. 4, as a result of which the blocking pieces 41A, 41B of the first closure part 4 enter into the closure openings 500A, 500B and consequently into the locking elements 51A, 51B of the second closure part 5 and at the same time widen the locking elements 51A, 51B by the latching projections 410, 510 running onto one another until the blocking pieces 41A, 41B snap into engagement in a positive locking manner with the locking elements 51A, 51B and as a result the second closure part 5 is fixed to the first closure part 4.

The closing operation is supported magnetically by the magnet elements 43A, 43B, 53A, 53B, which are situated opposite one another in a magnetically attracting manner, so that the closing of the closure device 2 can be effected in a largely automatic manner by moving the second closure part 5 closer to the first closure part 4.

Whilst the closing of the closure device 2 is effected by positioning the second closure part 5 on the first closure part 4 in the closing direction X, the closure device 2 can be opened again by rotating the second closure part 5, which is connected to the container 3, with respect to the first closure part 4 in an opening direction Y (FIG. 4) which is directed about the closing direction X. When rotating the second closure part 5 in the opening direction Y with respect to the first closure part 4, the blocking pieces 41A, 41B are moved through the openings 511 of the locking elements 51A, 51B and pass through the laterally opening side openings 502A, 502B of the closure openings 500A, 500B out of the region of the closure openings 500A, 500B. The positive locking engagement between the closure parts 4, 5 is consequently eliminated so that the second closure part 5 is able to be removed from the first closure part 4.

When positioning the closure parts 4, 5 together, a pivot 42, which protrudes from the body 40 of the first closure part 4 (see FIG. 4 for example), moves into engagement with a rotational opening 542 on a fastening element 54 on the body 50 of the second closure part 5, as a result of which the second closure part 5 is mounted on the first closure part 4 so as to be rotatable in the opening direction Y. The opening movement of the second closure part 5 relative to the first closure part 4 is guided in this way, which simplifies the handling and in particular avoids the closure parts 4, 5 tilting when opening.

As shown in FIG. 3, the magnet elements 43A, 43B, 53A, 53B of each closure part 4, 5 point with different poles N, S to the respectively other closure part 5, 4. Thus, the magnet elements 43A, 43B of the first closure part 4 point toward the second closure part 5 on the one end with a north pole N (magnet element 43A) and on the other end with a south pole S (magnet element 43B). Conversely, the magnet elements 53A, 53B of the second closure part 5 point toward the first closure part 4 on the one end with a south pole S (magnet element 43A) and on the other end with a north pole N (magnet element 53B). The achievement of said opposite polarization is that the closure parts 4, 5 are only able to be positioned together in precisely one position, thus ensuring that the closing of the closure device is able to be effected reliably with the blocking pieces 41A, 41B latching completely with the locking elements 51A, 51B.

When opening the closure device 2, the magnet elements 53A, 53B of the second closure part 5 are also moved relative to the magnet elements 43A, 43B of the first closure part 4 so that the magnetic attraction between the magnet elements 43A, 43B, 53A, 53B is weakened and the closure parts 4, 5 are consequently able to be removed from one another in an easy manner.

The second closure part 5 is fixed to the container 3, for example a drinking bottle, so that the container 3 can be fastened to the first closure part 4 and consequently to the frame 10 of the vehicle 1 by way of the second closure part 5. The connection between the second closure part 5 and the container 3, in this connection (with the closure device 2 open), is releasable by the second closure part 5 being inserted with its body 50 into a receiving indentation 31 on a body 30 of the container 3 and being connected by means of the fastening element 54 to an adaptor part 6 of the container 3.

The fastening element 54 is received so as to be rotatable in an opening 501 of the body 50 of the second closure part 5. The fastening element 54, in this connection, comprises a head 540 from which protrudes a shank 543 with a locking web 544 arranged thereon. A tool engagement in the form of a slot 541 is molded into the head 540 so that the fastening element 54 is able to be rotated, for example by using a coin in the opening 501 of the body 50 of the second closure part 5.

The adaptor part 6 is connected fixedly to the body 30 of the container 3. To this end, the adaptor part 6 is received by means of a plate element 60 on a fastening surface 310 in the receiving indentation 31 and, for example, is welded or bonded to the body 30. Locking elements 61, which are spaced apart from one another by means of an engagement slot 62 and each comprise a recess 610 formed therein, protrude from the plate element 60.

For connecting the second closure part 2 to the container 3, the fastening element 54 is moved into the position shown in FIGS. 6A, 6B with respect to the body 50 of the second closure part 5 so that the locking web 544 on the shank 543 of the fastening element 54, when the second closure part 5 is inserted into the receiving indentation 31, is able to enter into the engagement slot 62 between the locking elements 61 of the adaptor part 6. When inserted, the fastening element 54, in this connection, moves via a pivot 545 to rest on a portion of the adaptor part 6, as can be seen from FIG. 6B.

Figure 5A:
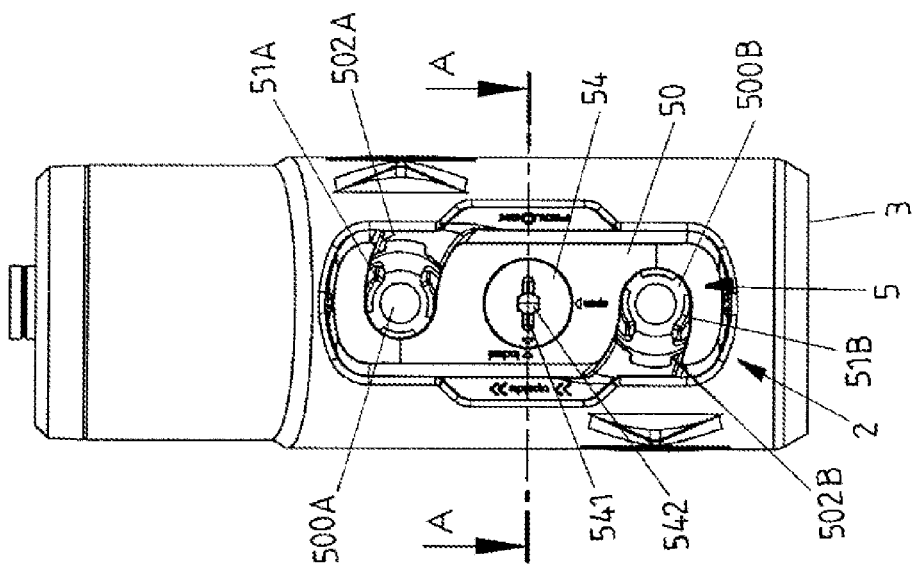
FIG. 5A shows a front view of the container with a second closure part arranged thereon.
Figure 5B:
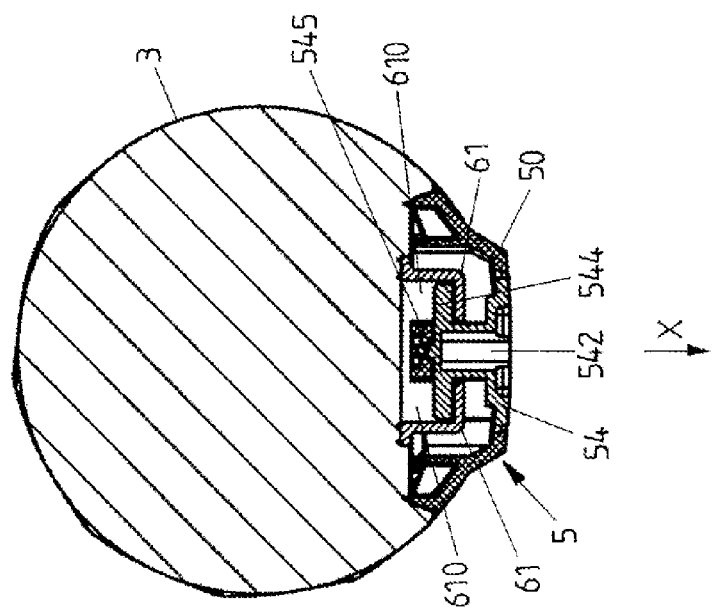
FIG. 5B shows a sectional view along the line A-A according to FIG. 5A.

As a result of rotating the fastening element 54 (for example by using a coin which engages in the slot 541 on the head 540 of the fastening element 50), the fastening element 54 is then rotated in the opening 501 of the body 50 of the second closure part 5 so that the locking web 544 moves into positive locking engagement with the recesses 610 inside the locking elements 61 of the adaptor part 6, as can be seen from FIGS. 5A and 5B. The second closure part 5 is consequently fixed securely but releasably on the adaptor part 6 of the container 3.

Once the second closure part 5 is positioned on the first closure part 4, this also results in the container 3 being fixed to the frame 10.

The container 3 can be realized as a drinking bottle, as a storage container for a tool or other objects, for example for a battery. The container 3 can also be realized, however, as a bag or the like.

The closure device 2 can be used for connecting a container 3 to a frame 10 of a vehicle 1, in particular of a two-wheeler or a three-wheeler, the vehicle 1 being able to be driven by human power or also electrically.

By the second closure part 5 being fixed releasably on the container 3, the container 3 is able to be replaced, which makes it possible to use a closure device 2 with completely different containers 3. Thus, when the container 3 is to be replaced by another container, the second closure part 5 can be released in a simple manner from the previous container 3 in order to connect the second closure part 5 to another container and consequently to re-use the closure device 2.

By, in the case of the exemplary embodiment shown, the container 3 being closed as a result of directly positioning the closure parts 4, 5 together and being opened again as a result of rotating the container 3, comparatively little space is necessary on the vehicle 1 for the handling of the container 3 (compared to known containers, for example in the form of drinking bottles, which have to be moved tangentially along the frame bar 100 for positioning or releasing). In addition, the closure device 2 holds the container 3 reliably on the frame 10 and is in particular also resistant to mechanical impacts when the vehicle 1 is in use.

The concept underlying the solution is not limited to the exemplary embodiments depicted above but can also be realized in a completely different manner in completely different embodiments.

LIST OF REFERENCES

1 Vehicle (bicycle)
10 Frame
100 Frame bar
2 Closure device
3 Container (bottle)
30 Body
31 Receiving indentation
310 Fastening surface
4 Closure part
40 Body
400A, 400B Receiving opening
41A, 41B Blocking piece
410 Latching projection
411 Shank
42 Pivot
43A, 43B Magnet element
5 Closure part
50 Body
500A, 500B Closure opening
501 Opening
502A, 502B Side opening
51A, 51B Locking element
510 Latching projection
511 Opening
512 Annular body
52A, 52B Fastening plate
520 Fastening groove
521 Magnet receiving means
53A, 53B Magnet element
54 Fastening element
540 Head
541 Slot
542 Rotational opening
543 Shank
544 Locking web
545 Pivot point
6 Adaptor part
60 Plate element
61 Locking elements
610 Recess
62 Engagement slot
N North pole
S South pole
X Closing direction
Y Opening direction

The invention claimed is:

1. A closure device for connecting a container to a frame of a vehicle, comprising:
   a first closure part which is to be arranged on the frame and comprises a first magnet element and
   a second closure part which is assigned to the container and comprises a second magnet element, wherein the second closure part is positionable on the first closure part in a closing direction and is latched mechanically with the first closure part in a closed position,
   wherein the second closure part is releasably connectable to the container, and
   wherein the second closure part comprises a body and a fastening element which is arranged so as to be adjustable on the body and is realized to connect the second closure part to the container in a first position, and is transferrable from the first position into a second position in order to release the connection between the container and the second closure part.

2. The closure device as claimed in claim 1, wherein the second closure part is connectable in a positive locking manner to an adaptor part of the container.

3. The closure device as claimed in claim 1, wherein one of the closure parts comprises at least one blocking piece and the other of the closure parts at least one locking element, wherein the at least one blocking piece engages in the locking element in the closed position in such a manner that the second closure part is held on the first closure part in opposition to the closing direction.

4. The closure device as claimed in claim 3, wherein the at least one locking element is realized in an elastically resilient manner transversely to the closing direction.

5. The closure device as claimed in claim 4, wherein the at least one blocking piece comprises a first latching projection and the at least one locking element comprises a second latching projection, wherein the first latching projection and the second latching projection engage one another in a positive locking manner in the closed position.

6. The closure device as claimed in claim 3, wherein the at least one blocking piece comprises a first latching projection and the at least one locking element comprises a second latching projection, wherein the first latching projection and the second latching projection engage one another in a positive locking manner in the closed position.

7. The closure device as claimed in claim 3, wherein the at least one locking element extends in a ring-shaped manner about the closing direction, wherein the at least one locking element, viewed along a circumferential direction about the closing direction, is opened by an opening, through which the at least one blocking piece is movable for opening the closure device.

8. The closure device as claimed in claim 1, wherein the second closure part is releasable from the first closure part as a result of moving in an opening direction which is different to the closing direction.

9. The closure device as claimed in claim 8, wherein the opening direction corresponds to a rotational direction directed about the closing direction.

10. The closure device as claimed in claim 9, wherein one of the closure parts comprises a pivot which engages with a rotational opening of the other closure part in the closed position and mounts the closure parts together so as to be rotational along the opening direction.

11. The closure device as claimed in claim 8, wherein one of the closure parts comprises a pivot which engages with a rotational opening of the other closure part in the closed position and mounts the closure parts together so as to be rotational along the opening direction.

12. The closure device as claimed in claim 1, wherein the first closure part comprises two first magnet elements which are spaced apart from one another transversely to the closing direction and the second closure part comprises two magnet elements which are spaced apart from one another transversely to the closing direction.

13. The closure device as claimed in claim 12, wherein the magnet elements of each closure part point toward the other closure part with opposite magnetic poles.

14. A bicycle, comprising a closure device as claimed in claim 1 for fastening a container to a frame of the bicycle.

15. The closure device as claimed in claim 1, wherein the vehicle comprises a two or three wheel vehicle.

16. The closure device as claimed in claim 1, wherein the fastening element is arranged so as to be rotatable on the body.

17. A container for using on a bicycle, comprising a closure device comprising:
   a closure device for connecting a container to a frame of a vehicle, comprising:
   a first closure part which is to be arranged on the frame and comprises a first magnet element and
   a second closure part which is assigned to the container and comprises a second magnet element, wherein the second closure part is positionable on the first closure part in a closing direction and is latched mechanically with the first closure part in a closed position,
   wherein the second closure part is releasably connectable to the container,
   wherein one of the closure parts comprises at least one blocking piece and the other of the closure parts at least one locking element, wherein the at least one blocking piece engages in the locking element in the closed position in such a manner that the second closure part is held on the first closure part in opposition to the closing direction, and
   wherein the at least one locking element is realized in an elastically resilient manner transversely to the closing direction.

18. The container as claimed in claim 17, wherein the container is a drinking bottle, a tool container or a container for a battery.

19. A closure device for connecting a container to a frame of a vehicle, comprising:
   a first closure part which is to be arranged on the frame and comprises a first magnet element and
   a second closure part which is assigned to the container and comprises a second magnet element, wherein the second closure part is positionable on the first closure part in a closing direction and is latched mechanically with the first closure part in a closed position,
   wherein the second closure part is releasably connectable to the container,
   wherein the second closure part is connectable in a positive locking manner to an adaptor part of the container, and
   wherein the second closure part comprises a body and a fastening element which is arranged so as to be adjustable on the body and is realized to connect the second closure part to the container in a first position, and is transferrable from the first position into a second position in order to release the connection between the container and the second closure part.

* * * * *